United States Patent

Poljansek

Patent Number: 5,983,153
Date of Patent: Nov. 9, 1999

[54] SYSTEM FOR DETERMINING GEAR RATIO CHANGES FOR AN AUTOMATIC TRANSMISSION

[75] Inventor: Marko Poljansek, Reutlingen, Germany

[73] Assignee: Robert Bosch GmbH, Stuttgart, Germany

[21] Appl. No.: 08/824,783

[22] Filed: Mar. 26, 1997

[30] Foreign Application Priority Data

Mar. 26, 1996 [DE] Germany .............. 196 11 802

[51] Int. Cl.$^6$ .............. F16H 59/00; G06F 19/00
[52] U.S. Cl. .............. 701/51; 701/58
[58] Field of Search .............. 701/51, 53, 55, 701/56, 58, 65; 74/335, 336 R; 477/121

[56] References Cited

U.S. PATENT DOCUMENTS

| | | | |
|---|---|---|---|
| 4,829,434 | 5/1989 | Karmel et al. | 701/58 |
| 4,899,278 | 2/1990 | Yamamoto et al. | 701/62 |
| 5,241,476 | 8/1993 | Benford et al. | 701/59 |
| 5,558,600 | 9/1996 | Tsukamoto et al. | 477/121 |
| 5,716,301 | 2/1998 | Wild et al. | 477/97 |

FOREIGN PATENT DOCUMENTS

| | | |
|---|---|---|
| 0433603 | 6/1991 | European Pat. Off. |
| 0638742 | 2/1995 | European Pat. Off. |

OTHER PUBLICATIONS

"Die Adaptive Getriebesteuerung für die Automatikgetriebe der BMW Fahrzeuge mit Zwölfzylindermotor" by A. Welter et al., ATZ Automobiltechnische Zeitschrift 94 (1992) 9, pp. 428 to 436.

"Die Adaptive Getriebesteuerung für BMW–Automobile" by A. Welter et al., ATZ Automobiltechnische Zeitschrift 95 (1993) 9, pp. 420 to 434.

*Primary Examiner*—William A. Cuchlinski, Jr.
*Assistant Examiner*—Ed Pipala
*Attorney, Agent, or Firm*—Walter Ottesen

[57] ABSTRACT

The invention is directed to a system for determining the changes in gear ratio for an automatic transmission of a vehicle. Such an automatic transmission can be a fully automatic shifting step transmission or a known continuously variable transmission or an automated manual shift transmission. For determining the changes in gear ratio, a detection device for detecting the vehicle road speed and a determination device for determining the gear ratio changes of the automatic transmission are provided at least in dependence upon a first adaptation quantity. The essence of the invention is that the first adaptation quantity is determined from a time-dependent trace of the road speed of the vehicle. With the system, information is provided as to whether the vehicle is, at a particular point in time, in city traffic (low vehicle speed), on a country road (average vehicle speed) or on an expressway (high vehicle speed). This data is obtained in a simple manner via an evaluation of the trace of the road speed.

6 Claims, 4 Drawing Sheets

SYSTEM FOR DETERMINING GEAR RATIO CHANGES FOR AN AUTOMATIC TRANSMISSION

BACKGROUND OF THE INVENTION

So-called adaptive transmission controls are disclosed, for example, in the publication "ATZ Automobiltechnische Zeitschrift" 94 (1992) 9, pages 428 to 436 and "ATZ Automobiltechnische Zeitschrift" 95 (1993) 9, pages 420 to 434. In conventional transmission control, the changes of gear ratio of the transmission are generally effected especially in dependence upon the accelerator pedal position and the vehicle longitudinal speed. On the other hand, in adaptive transmission control, consideration is given to the type of driver and to the driving situation in which the vehicle is at a particular time. In driver-type recognition, a conclusion is drawn as to the driver command from, for example, the evaluation of characteristic accelerator pedal actuations. A specific shifting strategy is selected in dependence upon the results of this analysis while also considering the longitudinal speed of the vehicle. The driving-situation recognition reacts to actual occurrences, such as downhill travel, and facilitates shifting which deviates from the input via the characteristic lines. A detection of a so-called stop-and-go situation can be provided which concludes from the trace of the driving speed and of the angle of the accelerator pedal as to a stop-and-go driving situation which is common in city traffic. If such a situation is recognized, then, for example, engaging the first gear can be prevented. None of the known functions, however, offers a recognition of the driving situation which extends over the entire operating range of the vehicle.

SUMMARY OF THE INVENTION

It is an object of the invention to provide a system wherein an adaptation quantity is determined for the entire operating range of the vehicle.

The system of the invention is for determining the gear ratio changes in an automatic transmission of a motor vehicle and the system includes: detecting means for detecting the vehicle speed ($N_{ab}$); means for determining an adaptation quantity (BZ) from a time-dependent trace of the vehicle speed ($N_{ab}$); and, means for determining changes in the gear ratio ($i_{des}$) of the automatic transmission at least in dependence upon the adaptation quantity (BZ).

As mentioned, the invention proceeds from a system for determining the gear ratio changes for an automatic transmission of a vehicle. An automatic transmission of this kind can be a fully automatic shifting step transmission or a known continuously variable transmission or an automated manual shift transmission. The following are provided to determine gear ratio changes: detecting means for detecting the vehicle speed and determination means for determining the changes of gear ratio of the automatic transmission at least in dependence upon a first adaptation quantity. The essence of the invention is that the first adaptation quantity is determined from the time-dependent trace of the vehicle speed. With the invention, information is obtained in a simple manner by evaluating the trace of the road speed of the vehicle. This information concerns whether the vehicle is, for example, in city traffic (low vehicle speeds), on a country road (average vehicle speeds) or on an expressway (higher vehicle speeds). According to the invention, the shift strategy of the automatic transmission can be improved via the detection as to the type of roadway on which the vehicle is at a particular time. A burdensome up and down shifting of the transmission should be avoided on a country road which can sometimes be a winding road. In city traffic, the noise, exhaust-gas emissions and the creeping of the vehicle is minimized. High acceleration requirements (large accelerator pedal angles) for travel of the vehicle on an expressway should not necessarily trigger downshifting operations.

An advantageous embodiment of the invention provides that the actually detected vehicle speed is stored at pregiven time points and a conclusion is drawn from these stored speeds as to the time-dependent trace of the vehicle road speed. This can, for example, take place in that a pregiven number of vehicle speeds are stored, for example, in a ring memory system. These stored vehicle road speeds are then summed up to a sum value and this sum value is compared to at least one threshold value for determining the adaptation quantity. The magnitude of this summing result is then a criterion for the average speed with which the vehicle is driven at the particular time.

In addition, the invention provides that a continuous mean value is formed from the stored vehicle speeds and this mean value is compared to at least one threshold value for determining the adaptation quantity. In this embodiment, the continuous mean value gives information as to whether the vehicle is in an operating range of low speed (city traffic), in an operating range of average road speed (country road) or in a driving range of higher road speeds (expressway).

It is especially advantageous to combine the adaptation quantity determined in accordance with the invention (which indicates the driving situation of the vehicle, namely city traffic, country road or expressway) with a known driver-type detection. Depending upon the driving situation, the detected type of driver can be evaluated differently whereby an improved adaptation of the shift strategy to the type of driver is obtained.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
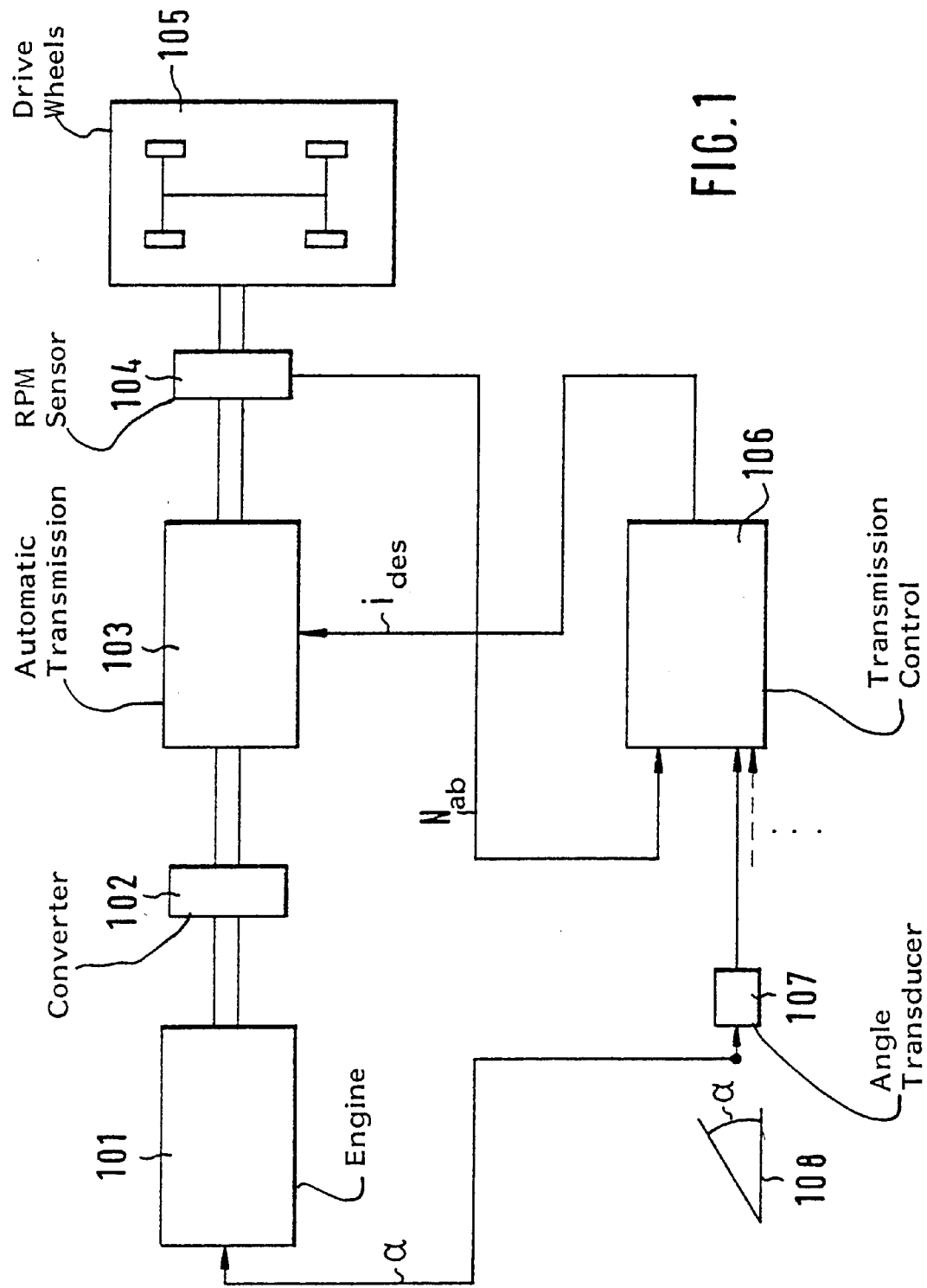
FIG. 1 is an overview block circuit diagram of an automatic transmission system.

In FIG. 1, reference numeral 101 identifies an engine of a motor vehicle. The output shaft of the engine is connected via a converter or clutch 102 to an automatic transmission 103. At the output end, the automatic transmission 103 is connected to the drive wheels 105 of the vehicle. The road speed can be determined by measuring the output rpm of the transmission output shaft utilizing an rpm sensor 104. The driver of the vehicle inputs the power of the engine 101 via the position α of the accelerator pedal 108. For this purpose, and generally for a gasoline engine, the throttle flap is actuated via the accelerator position, or for a diesel engine, the control rod is actuated which determines the quantity of fuel to the injected.

The position α of the accelerator pedal 108 is detected by the position angle transducer 107 and supplied to the transmission control 106. Likewise, the output rpm $N_{ab}$ is supplied to the transmission control 106 as a measure for the road speed of the vehicle. In addition, further variables can be used for the transmission control 106. The transmission control 106 determines the desired gear ratio $i_{des}$ for the automatic transmission 103 from the input signals.

Figure 2:
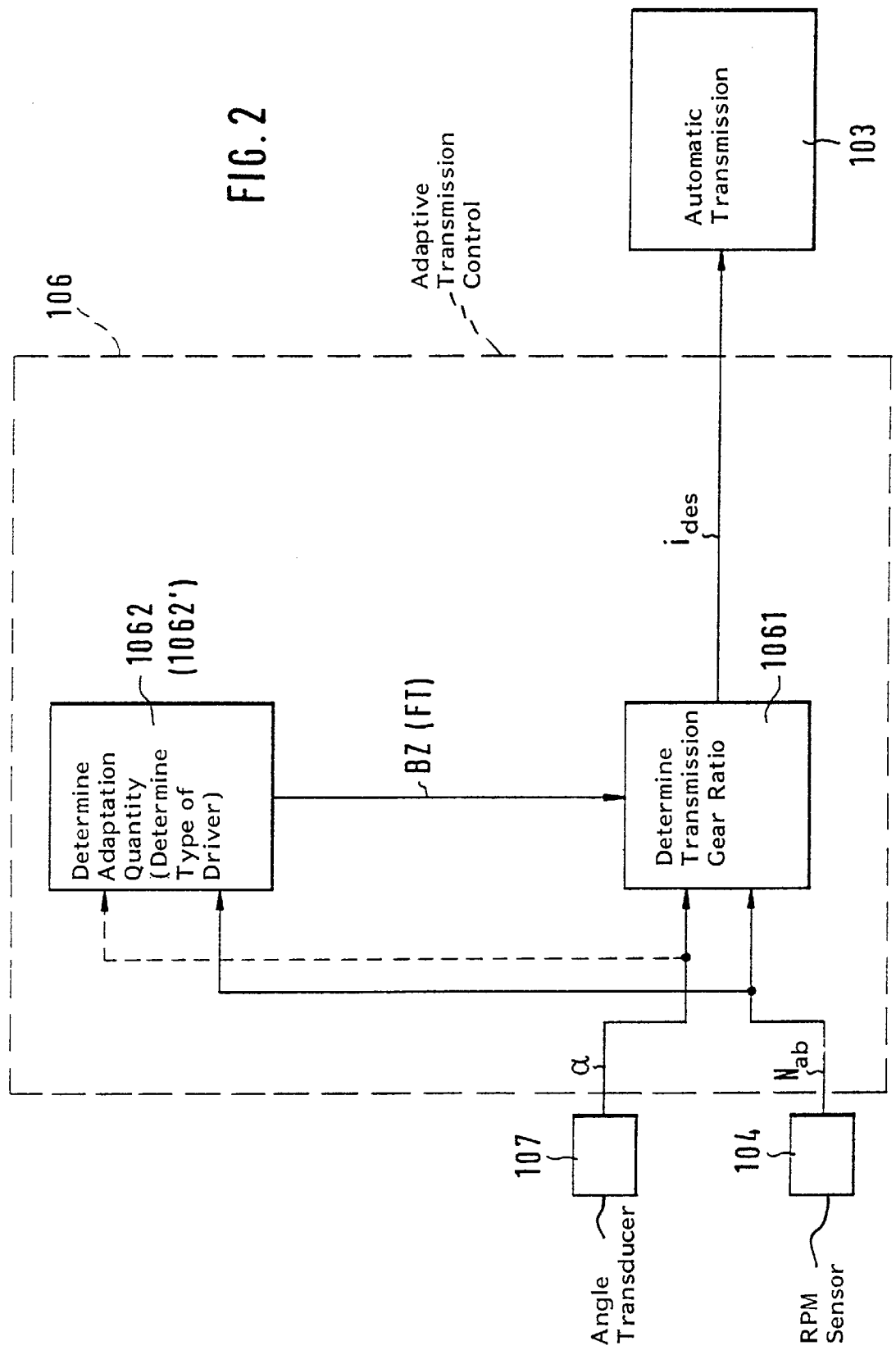
FIG. 2 is a block diagram showing a first configuration of block 106 of FIG. 1.

FIG. 2 shows in detail the function of the transmission control 106. The position α of the accelerator pedal and the road speed $N_{ab}$ are supplied to block 1061. The desired transmission gear ratio $i_{des}$ for the automatic transmission 103 is determined in block 1061 in dependence upon the two variables (α, $N_{ab}$) while considering other variables as required in a manner known per se utilizing characteristic fields.

The transmission control 106 is an adaptive transmission control, that is, different shift strategies or shift characteristic fields are provided for selection in block 1061. These shift strategies are effected in dependence upon the output signal BZ of block 1062 or output signal FT of block 1062'. For this purpose, the vehicle longitudinal speed $N_{ab}$ is supplied to block 1062 and block 1062'. Depending upon the configuration, the position α of the accelerator pedal is also supplied to blocks 1062 and 1062'. A finer or more than a three-step allocation can be provided.

Figure 3:
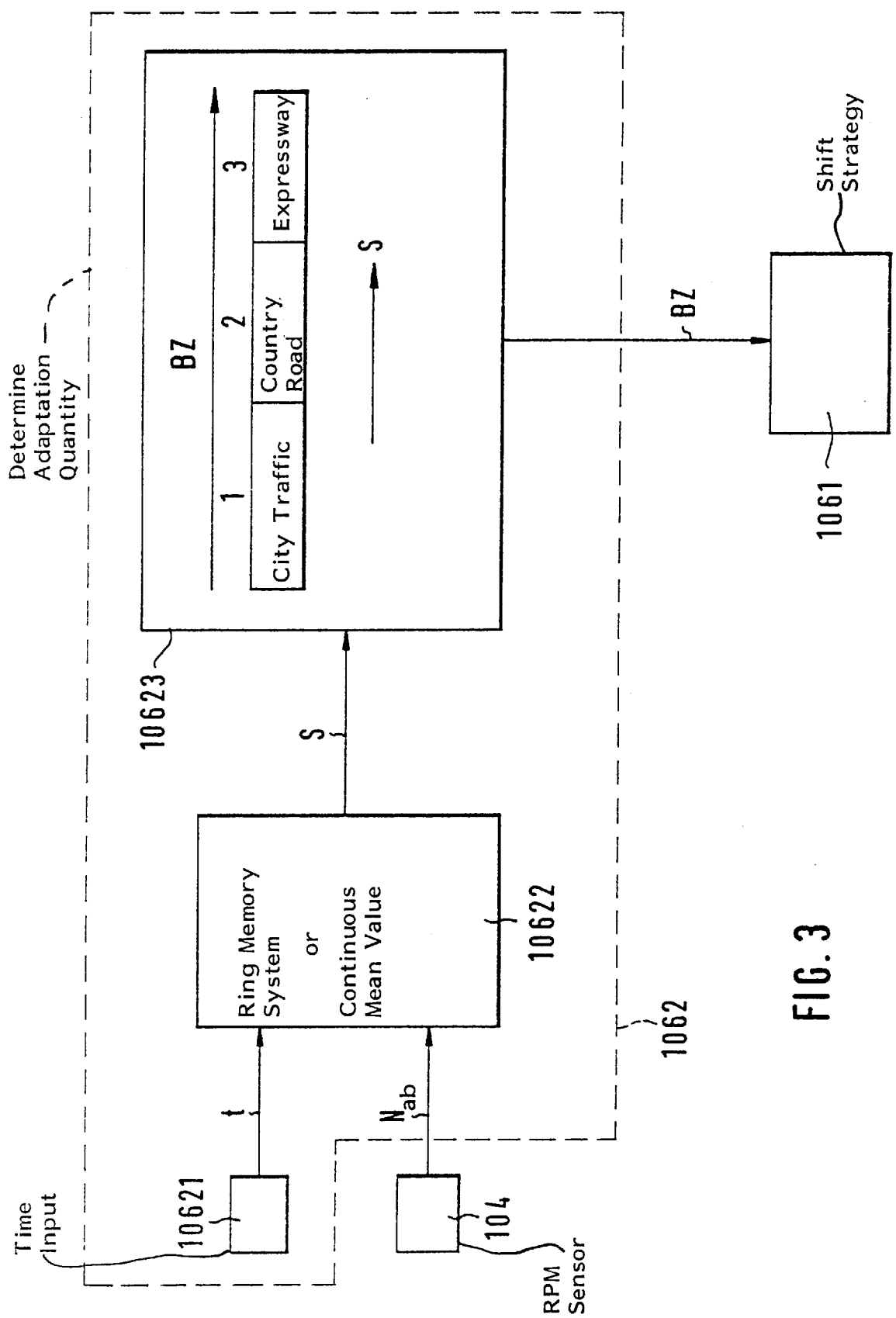
FIG. 3 is a block diagram providing a detailed illustration of the function of the transmission control represented by block 106 of FIG. 1; and, FIG. 4 is a block diagram of a further embodiment of the invention.

FIG. 3 shows a first embodiment of block 1062 by means of which an adaptation quantity BZ for selecting the shift strategy in block 1061 is determined. For this purpose, the travel speed $N_{ab}$ is viewed over defined time windows t by means of block 10622. This is effected in such a manner that the instantaneous vehicle speed is stored in a ring memory 10622 at discrete time intervals (time input 10621).

As an alternative to the formation of a ring memory system in block 10622, a continuous mean value can be generated directly over a specific time in block 10622.

The ring memory sum (or the continuous mean value) S is supplied to block 10623. By means of block 10623, the adaptation quantity BZ is determined in three steps in dependence upon the magnitude of the output signal of block 10622. A low value of the ring memory sum (or of the continuous mean value) S permits a conclusion to be drawn that the vehicle is in city traffic at that particular time. In this case, the adaptation quantity BZ=1 is set. If the ring memory sum (or the continuous mean value of the road speed) is in a mid range, then the adaptation quantity BZ=2 is set for operation on a country road; whereas, the adaptation quantity BZ=3 represents travel on an expressway.

In this way, and in the simplest manner, an adaptation of the shift strategy to the driving situation present in the entire driving range of the vehicle is obtained.

Figure 4:
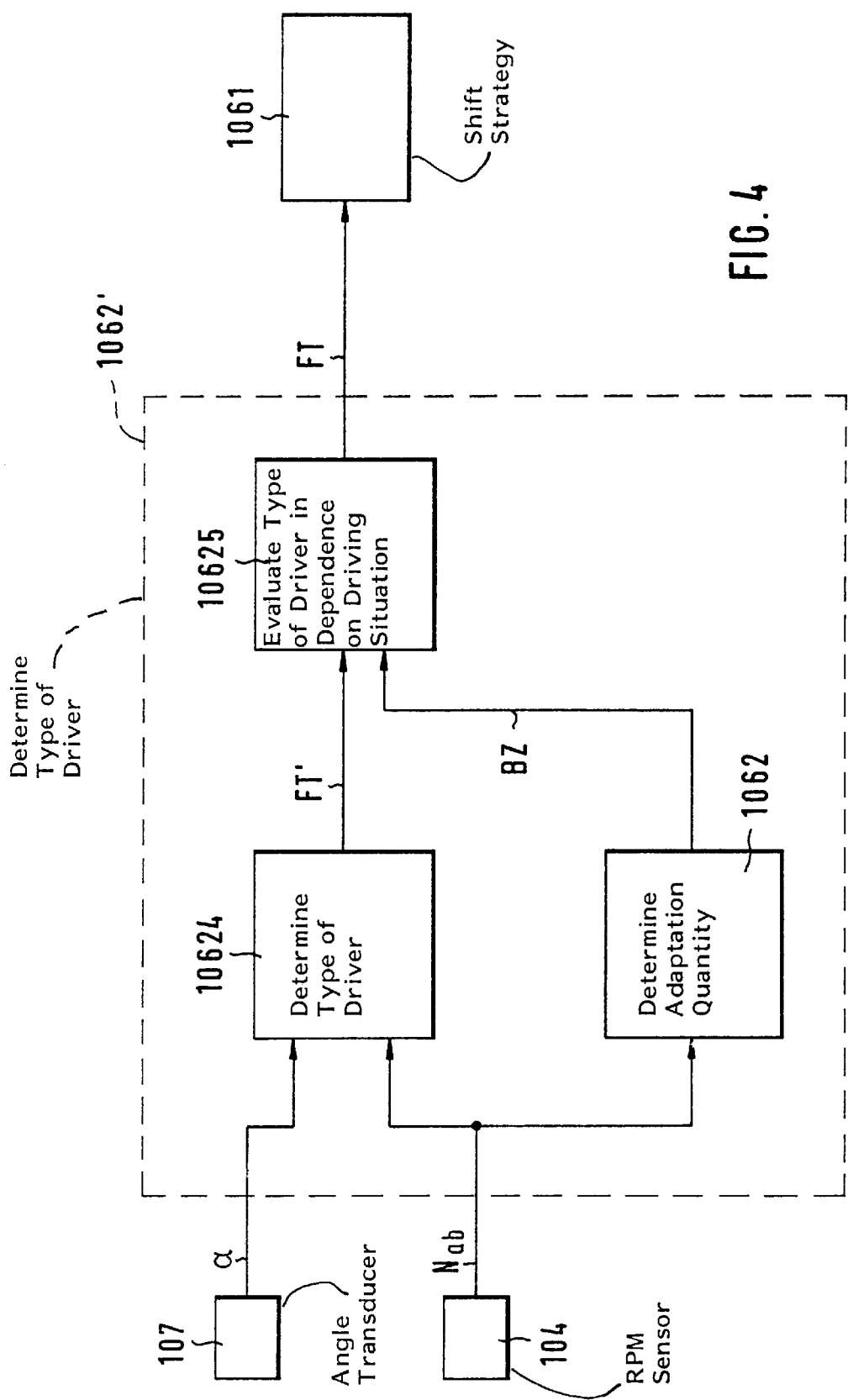

FIG. 4 shows a further embodiment of the invention. Here, and in a manner known per se, a quantity FT' which represents the type of driver, is determined in block 10624 from the position α of the accelerator pedal and from the vehicle longitudinal speed $N_{ab}$. Furthermore, and as described above, the adaptation quantity BZ is determined in block 1062 in dependence upon the vehicle longitudinal speed $N_{ab}$ and is supplied to block 10625. In block 10625, the quantity FT', which characterizes the type of driver, is evaluated in dependence upon the driving situation at a particular point in time (for example, city traffic, country road, expressway). The driver-type detection quantity FT determined in this manner is then applied in block 1061 for selecting the shift strategy.

The ranges determined with the invention lead to different configurations of the determination of the driver type. On a country road lower gears are needed, for example in curved regions thereof, which is in contrast to an expressway where acceleration demands must not necessarily be realized with a down shifting.

In addition to the effects of different ranges (city traffic, country road, expressway) on the type of driver and therefore on the shift strategy, the adaptation quantity BZ determined in accordance with the invention should also be used to support the driver when driving in city traffic. For example, the tendency of a conventional automatic transmission to creep should be reduced in that the second gear should be set at standstill of the vehicle after the vehicle comes to a stop. Furthermore, the shift hystereses between upshifting operations and downshifting operations can be increased when city traffic is detected in accordance with the invention. This leads to the situation that in city traffic it is unnecessary to shift too often.

It is understood that the foregoing description is that of the preferred embodiments of the invention and that various changes and modifications may be made thereto without departing from the spirit and scope of the invention as defined in the appended claims.

What is claimed is:

1. A system for determining the gear ratio changes in an automatic transmission of a motor vehicle, the system comprising:

detecting means for detecting the vehicle speed ($N_{ab}$);

means for determining an adaptation quantity (BZ) from a time-dependent trace of said vehicle speed ($N_{ab}$); and, means for determining changes in said gear ratio ($i_{des}$) of said automatic transmission at least in dependence upon said adaptation quantity (BZ).

2. The system of claim 1, further comprising:

means for storing the actual detected vehicle speed ($N_{ab}$) at pregiven time points (t); and, means for forming a conclusion as to said time-dependent trace of said vehicle speed ($N_{ab}$) from the vehicle speeds stored at said time points (t).

3. The system of claim 2, wherein a pregiven number of said vehicle speeds are stored; and, said system further comprising means for summing the stored vehicle speeds to a sum value (S); and, means for comparing said sum value (S) to at least one threshold value to determine said adaptation quantity (BZ).

4. The system of claim 2, further comprising means for forming a continuous mean value from the stored vehicle speeds; and, means for comparing said mean value to at least one threshold value to determine said adaptation quantity (BZ).

5. The system of claim 1, wherein said adaptation quantity (BZ) is a first adaptation quantity (BZ); and, wherein said system comprises:

means for determining a second adaptation quantity (FT) which represents the type of driver of the vehicle; and, means for determining changes in said gear ratio ($i_{des}$) in dependence upon a coupling of said first and second adaptation quantities (BZ, FT).

6. The system of claim 1, wherein said adaptation quantity (BZ) indicates whether the vehicle is, at a particular time, in city traffic or on a country road or on an expressway.

* * * * *